Oct. 7, 1941.                W. C. STEVENSON                 2,258,369
                   PHOTOELECTRIC DEVICE FOR INDICATING SPEED
                          Filed May 6, 1938            2 Sheets-Sheet 1
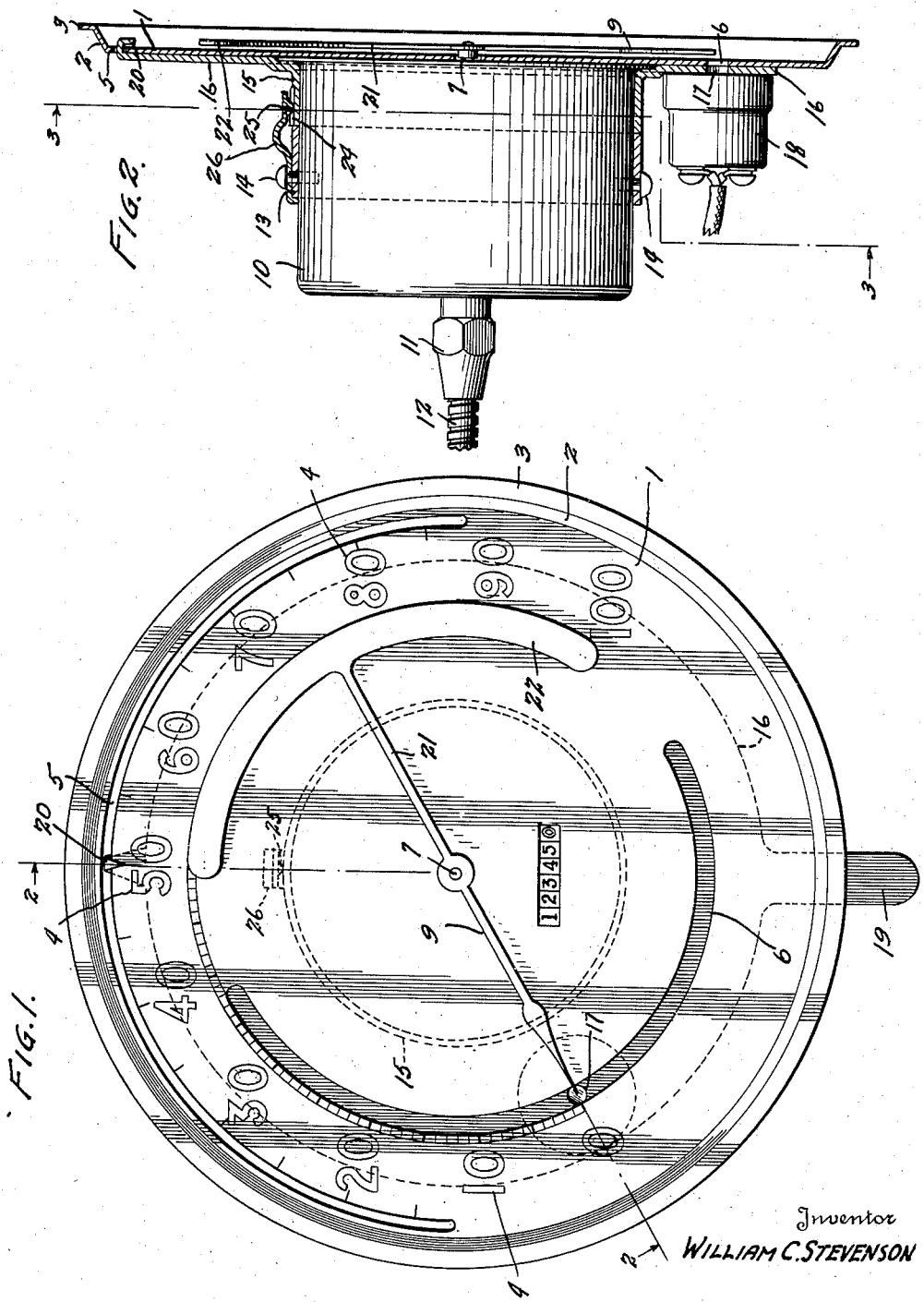
Inventor
WILLIAM C. STEVENSON
By Semmes, Keegin & Semmes
Attorneys Oct. 7, 1941.  W. C. STEVENSON  2,258,369
PHOTOELECTRIC DEVICE FOR INDICATING SPEED
Filed May 6, 1938  2 Sheets-Sheet 2

Inventor
WILLIAM C. STEVENSON
By Semmes, Keegin & Semmes
Attorneys

Patented Oct. 7, 1941

2,258,369

UNITED STATES PATENT OFFICE 2,258,369

PHOTOELECTRIC DEVICE FOR INDICATING SPEED

William C. Stevenson, Middleburg, Va.

Application May 6, 1938, Serial No. 206,483

7 Claims. (Cl. 250—41.5)

My invention relates to a safety speed regulating mechanism, and is particularly adapted for indicating the speed of motor vehicles.

In my co-pending application Serial No. 206,-482, filed May 6, 1938, I have shown a system for giving safety warning signals when a predetermined speed of a vehicle has been reached by means of mechanical contact elements closing operating circuits which actuate the warning signals. In the form of device shown in this application I employ a light sensitive element which is adapted to operate a relay to close an operating circuit that actuates the warning signal or signals. In the particular form of construction shown in the drawings, the circuit containing the light sensitive cell is used to control a relay which closes an operating circuit for both an audible and a visual signal.

One of the advantages of the form of construction shown is that the warning signals will be given out as long as the speed of the vehicle is in excess of the predetermined speed. Another important aspect of the invention resides in the accurate setting of the speed at which the warning signals will be made. This enables the operator to adjust the speed at which the warning signals will be given to the laws of the particular locality in which he is operating the motor vehicle.

The construction is simple, easy to repair and replace, and can be incorporated in the usual instrument panel in combination with an ordinary speedometer mechanism without much difficulty.

My invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 is a view in front elevation of a speedometer equipped with my system.

Figure 2 is a view taken along the line 2—2 of Figure 1, looking in the direction of the arrows.

Figure 3:
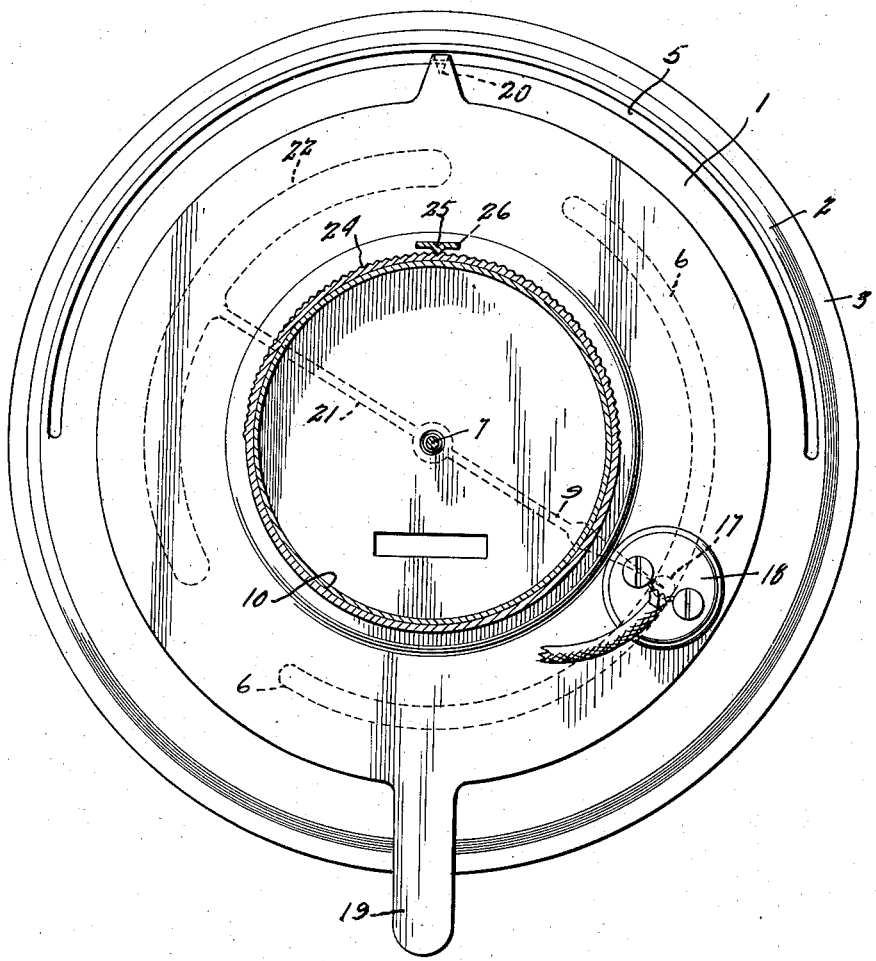
Figure 3 is a view taken along the line 3—3 of Figure 2, looking in the direction of the arrows.

Referring to the drawings, I have shown a speedometer instrument face 1 of pressed metal having a beveled flange 2 and an outer flange 3 which may support a glass plate, not shown. The speedometer face 1 has numerals 4 on it indicating the speed of the vehicle. The upper half of the speedometer face 1 is provided with a slot 5. There is also provided in this face a slot 6. Mounted on a shaft 7 is a pointer 9.

The pointer 9 is adapted to indicate the speed of the vehicle and is rotated by means of the shaft 7 which is driven by the usual speedometer mechanism, not shown, which is housed within a casing 10. A connection 11 through which projects a Bowden wire construction 12 permits the Bowden wire to enter the casing 10 and drive the speedometer mechanism.

On the casing 10 is fixed a collar 13 which is held in place by means of screws 14. Adjacent the fixed collar 13 is a rotatable collar 15 which carries a rotatable base 16 that may be integrally formed from the same stamping as the collar 15. The rotatable base is provided with an aperture at 17 behind which is mounted a light sensitive element 18. An operating handle 19 projects beyond the lower edge of the dial face, as is shown in Figure 1. This operating handle 19 is used to adjust the position of the base 16. At the top of the base 16 is a pointer 20 which slides in the slot 5 on the dial face and indicates the setting of the speed at which the warning signal will be given. The pointer 9 has an extension 21 which carries an arcuate shutter 22.

The arrangement is such that, when the pointer 9, for instance, reaches fifty miles an hour if the pointer 20 is set at fifty miles an hour, the arcuate shutter 22 will pass over the aperture 17 through which light enters into the light sensitive element 18. This will shut off the light entering the light sensitive element 18 and will cause the warning signal to be given.

It is to be noted that the shutter 22 is of sufficient length so that, if the pointer 9 moves beyond the speed at which the warning signal is given, the warning signal will still be in operation since the light passing through the aperture 17 will be shut off by the remaining length of the shutter 22.

In order to hold the pointer 20 in any position of adjustment, the collar 15 is provided with serrations or notches 24 in which fits a projection 25 formed on a spring member 26 that is held by one of the rivets 14. Thus the base 16 will be maintained in any desired position, setting the device for operation at the desired speed.

Figure 4:
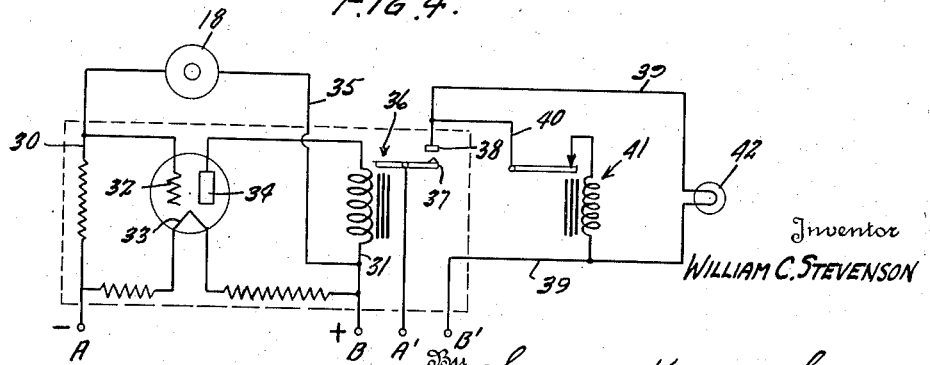
Figure 4 is a diagram of a wiring circuit to be used with the device.

The circuit arrangement for operating the warning signal, which in the present construction is both an audible signal and a visual signal, is shown in Figure 4. A source of current is diagrammatically illustrated as connected at points A and B. The circuit includes a vacuum tube having a grid circuit 30 and a plate circuit 31. The vacuum tube has a grid 32, filament 33, and a plate 34. A circuit 35 connects the grid circuit and the plate circuit and contains the light sensitive element 18.

The arrangement is such that, upon shutting off the source of light to the light sensitive element 18, there will be a change in the output of the plate circuit 31. Light passing to the light sensitive element 18 may be the usual daylight or may be the light from a lamp on the dashboard or any other convenient location. The plate current in plate circuit 31 is effected to operate a relay, indicated generally by the numeral 36, to close the circuit between contacts 37 and 38. The contact 37 is connected to a current source at A'. The contact 38 is connected through a lead 39 to the current source at B'. A shunt circuit 40 carries a buzzer mechanism, generally indicated by the numeral 41, and a light 42 is shown connected in the circuit 39.

Upon shutting off the light to the light sensitive element 18, current in the plate circuit 31 is effected to close the circuit through the contacts 37 and 38 which causes the light 42 to be lit and the buzzer 41 to sound.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In combination with an indicating device; means for closing an electrical circuit comprising; a dial having a slot disposed in the face thereof, a light sensitive element mounted behind the said slot, a hand adapted to move over said dial and provided with a shutter, said shutter being adapted to cut off the light to the said light sensitive element when the said hand arrives at a predetermined point and continues to cut off the light after the hand has moved past said point for a reasonable distance.

2. In combination with an indicating device; means for closing an electrical circuit comprising; a dial having a slot disposed in the face thereof, a light sensitive element mounted behind the said slot, means to adjustably move said light sensitive element in said slot, a hand adapted to move over said dial and provided with a shutter, said shutter being adapted to cut off the light to the said light sensitive element when the said hand arrives at a predetermined point and continues to cut off the light after the hand has moved past said point for a reasonable distance.

3. In combination with an indicating device; means for closing an electrical circuit comprising; a circular dial having two arcuate slots disposed in the face thereof, a light sensitive element mounted behind one of said slots, means to rotate said light sensitive element behind said slot, a hand adapted to move over said dial having a pointer at one end thereof; said hand having an arcuate shutter at the other end thereof, a setting member disposed in said second arcuate slot and adapted to move therein, said arcuate shutter shutting light from said light sensitive element when said pointer reaches the said setting member and continues to cut off the light after the pointer has passed the setting member for a reasonable distance.

4. In combination with an indicating device; means for closing an electrical circuit comprising; a circular dial having two arcuate slots disposed in the face thereof, a light sensitive element mounted behind one of said slots, a hand adapted to move over said dial having at one end thereof a pointer, said hand having at the other end thereof an arcuate shutter, a setting member disposed in said second arcuate slot and adapted to move therein, said arcuate shutter shutting light from said light sensitive element when said pointer reaches the said setting member and continues to cut off the light after the pointer has passed the setting member for a reasonable distance.

5. In combination with an indicating device; means for closing an electrical circuit comprising; a circular dial having an arcuate slot therethrough, a light sensitive element mounted behind the said slot, an indicating hand adapted to move over the said dial and carrying a shutter, said shutter being adapted to cut off the light to said light sensitive element when the indicating hand arrives at a predetermined point and continues to cut off the light after the hand has moved past said point for a reasonable distance, and a rotatable base on which the light sensitive element is mounted.

6. In combination with an indicating device; means for closing an electrical circuit comprising; a dial having a slot therethrough, a light sensitive element mounted behind the said slot, an indicating hand adapted to move over the said dial and carrying a shutter, said shutter being adapted to cut off the light to said light sensitive element when the indicating hand arrives at a predetermined point and continues to cut off the light after the hand has moved past said point for a reasonable distance, an adjustable movable base on which the light sensitive element is mounted, and a pointer carried by the said base to indicate the point at which the electrical circuit is closed.

7. In combination with an indicating device; means for closing an electrical circuit comprising; a fixed dial having an arcuate slot, a hand movable over said dial and provided with a shutter, a rotatable base concentric with and movable around the rear face of the dial, said base having an opening extending into the arcuate slot, a light sensitive cell carried by the base whereby light can pass through the arcuate slot opening and into the cell, and the shutter carried by the hand being adapted to cut off the light to the cell when the hand arrives at a predetermined point and continuing to cut off said light for a reasonable distance after said point is passed.

WILLIAM C. STEVENSON.